United States Patent [19]

Van Der Schie

[11] Patent Number: 4,819,788

[45] Date of Patent: Apr. 11, 1989

[54] ZERO PRESSURE ACCUMULATION CONVEYOR AND BRAKE ASSEMBLY

[75] Inventor: Donn R. Van Der Schie, Grand Haven, Mich.

[73] Assignee: Ermanco Incorporated, Spring Lake, Mich.

[21] Appl. No.: 154,521

[22] Filed: Feb. 11, 1988

Related U.S. Application Data

[63] Continuation of Ser. No. 900,268, Aug. 26, 1986, abandoned, which is a continuation of Ser. No. 689,509, Jan. 8, 1985, abandoned, which is a continuation of Ser. No. 343,222, Jan. 27, 1982, abandoned.

[51] Int. Cl.⁴ ............................................. B65G 13/06
[52] U.S. Cl. ..................................... 198/781; 188/75; 198/854; 198/857
[58] Field of Search ............... 198/781, 783, 789, 790, 198/791, 857; 188/64, 74, 75, 76

[56] References Cited

U.S. PATENT DOCUMENTS

| | | | |
|---|---|---|---|
| 2,531,913 | 11/1950 | Kaim | 188/75 |
| 3,465,850 | 9/1969 | Sexton | 188/75 |
| 3,650,375 | 3/1972 | Fleischauer et al. | 198/790 |
| 3,696,912 | 10/1972 | Fleischauer et al. | 198/781 |
| 3,840,110 | 10/1974 | Molt et al. | 198/781 |
| 4,355,715 | 10/1982 | Chorlton | 198/781 |
| 4,372,442 | 2/1983 | Fleischauer | 198/790 |

FOREIGN PATENT DOCUMENTS

| | | | |
|---|---|---|---|
| 149906 | 11/1981 | Japan | 198/781 |
| 931605 | 5/1982 | U.S.S.R. | 198/789 |
| 1580400 | 12/1980 | United Kingdom | 198/790 |

Primary Examiner—Robert J. Spar
Assistant Examiner—Cheryl L. Gastineau
Attorney, Agent, or Firm—Lockwood, Alex, FitzGibbon & Cummings

[57] ABSTRACT

A live roller zero pressure accumulation conveyor and brake assembly are described. The brake assembly includes a rotatable drive shaft surrounded by a tubular torque tube. The drive shaft extends into the torque tube and has a diameter such that the cylindrical surface of the drive shaft is capable of frictionally engaging the interior of the torque tube to rotate the torque tube when the drive shaft is rotated, but to slip relative to the torque tube when rotation of the torque tube is restrained. Clamping members surround the torque tube and are movable relative to the exterior surface of the torque tube between a first position in which the clamping surfaces are moved out of contact with the torque tube and the rotating drive shaft rotates the torque tube, and a second position in which the clamping surfaces move into contact with the exterior of the torque tube to restrain the torque tube from rotating with the drive shaft.

10 Claims, 6 Drawing Sheets

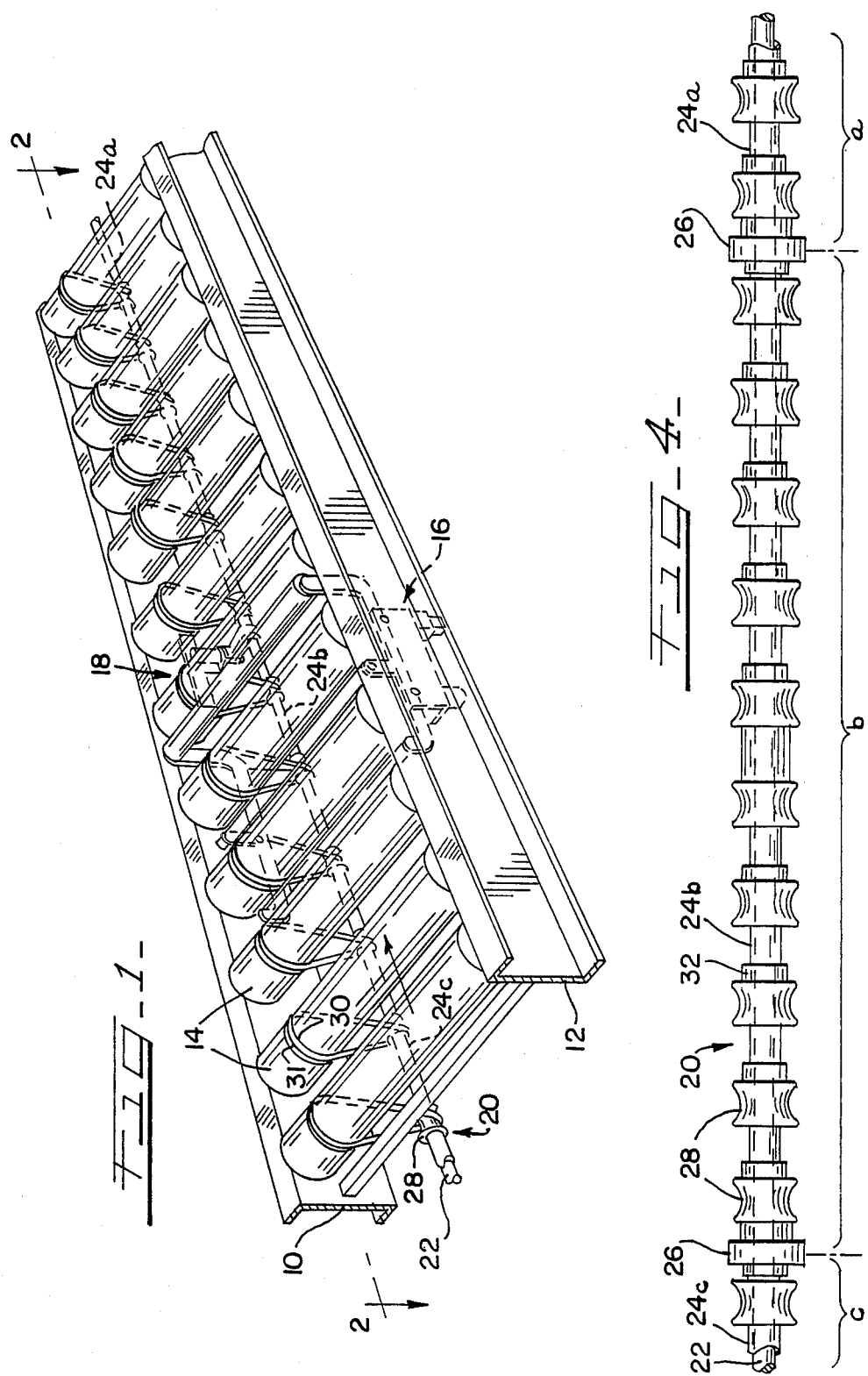

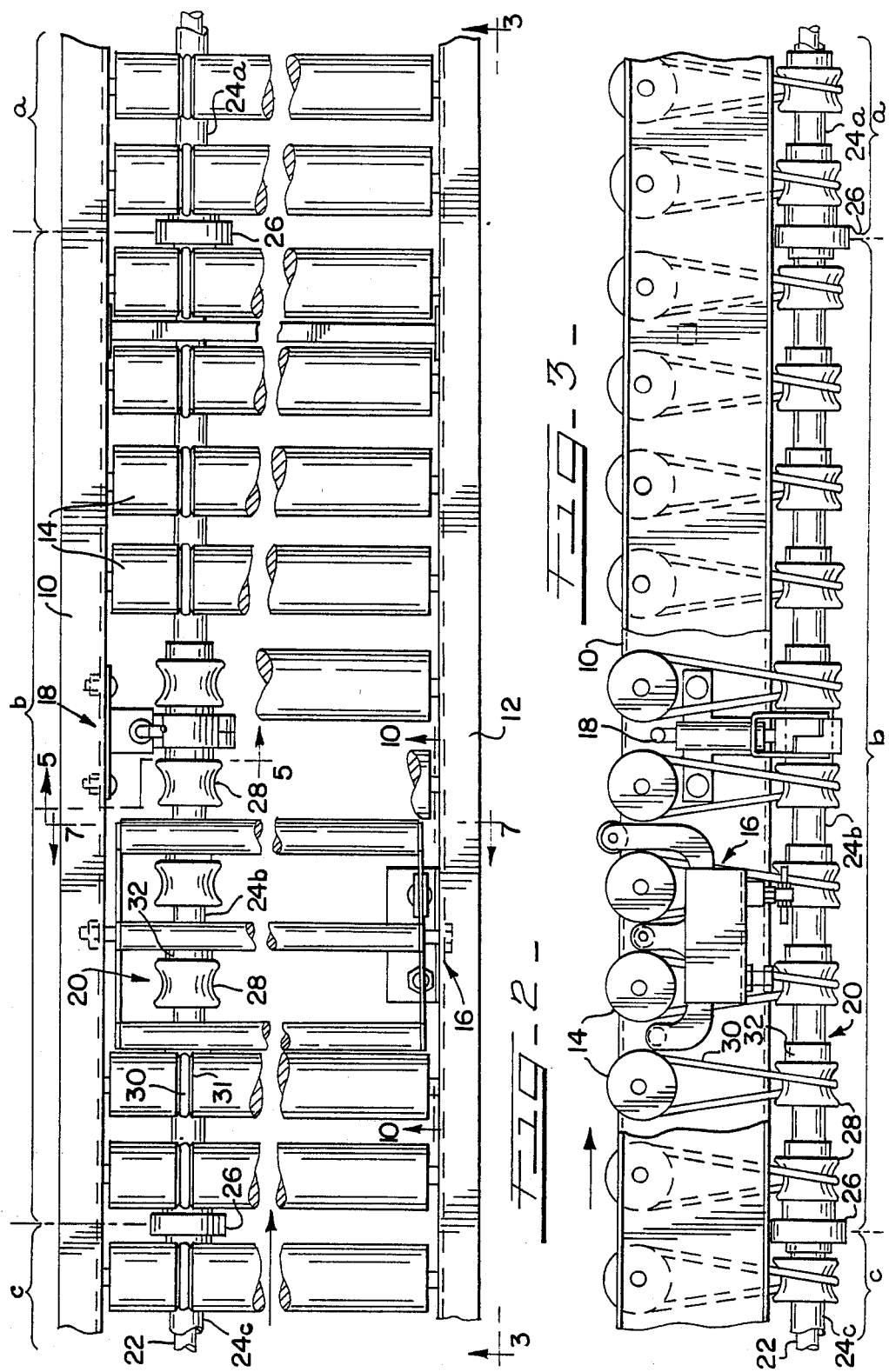

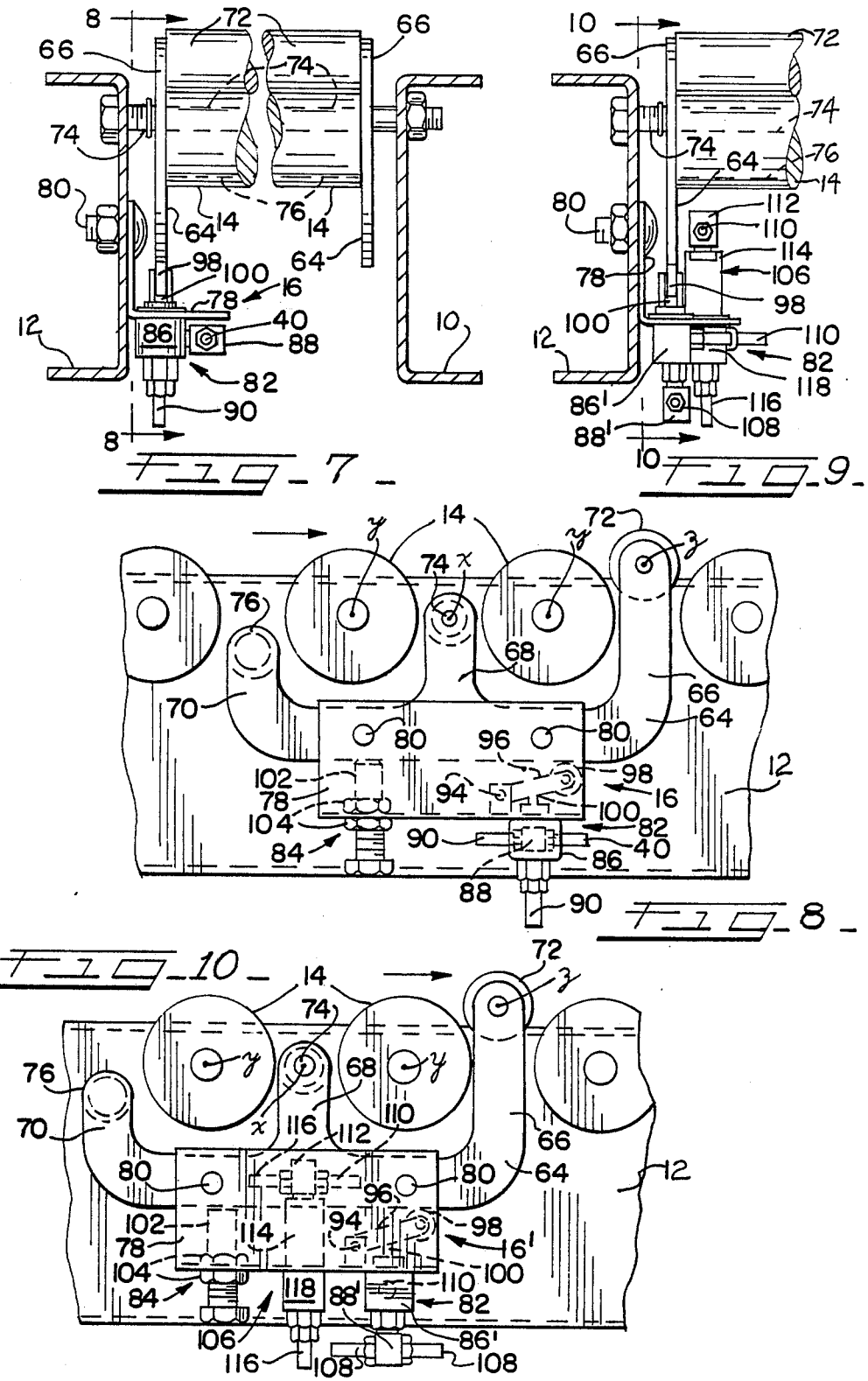

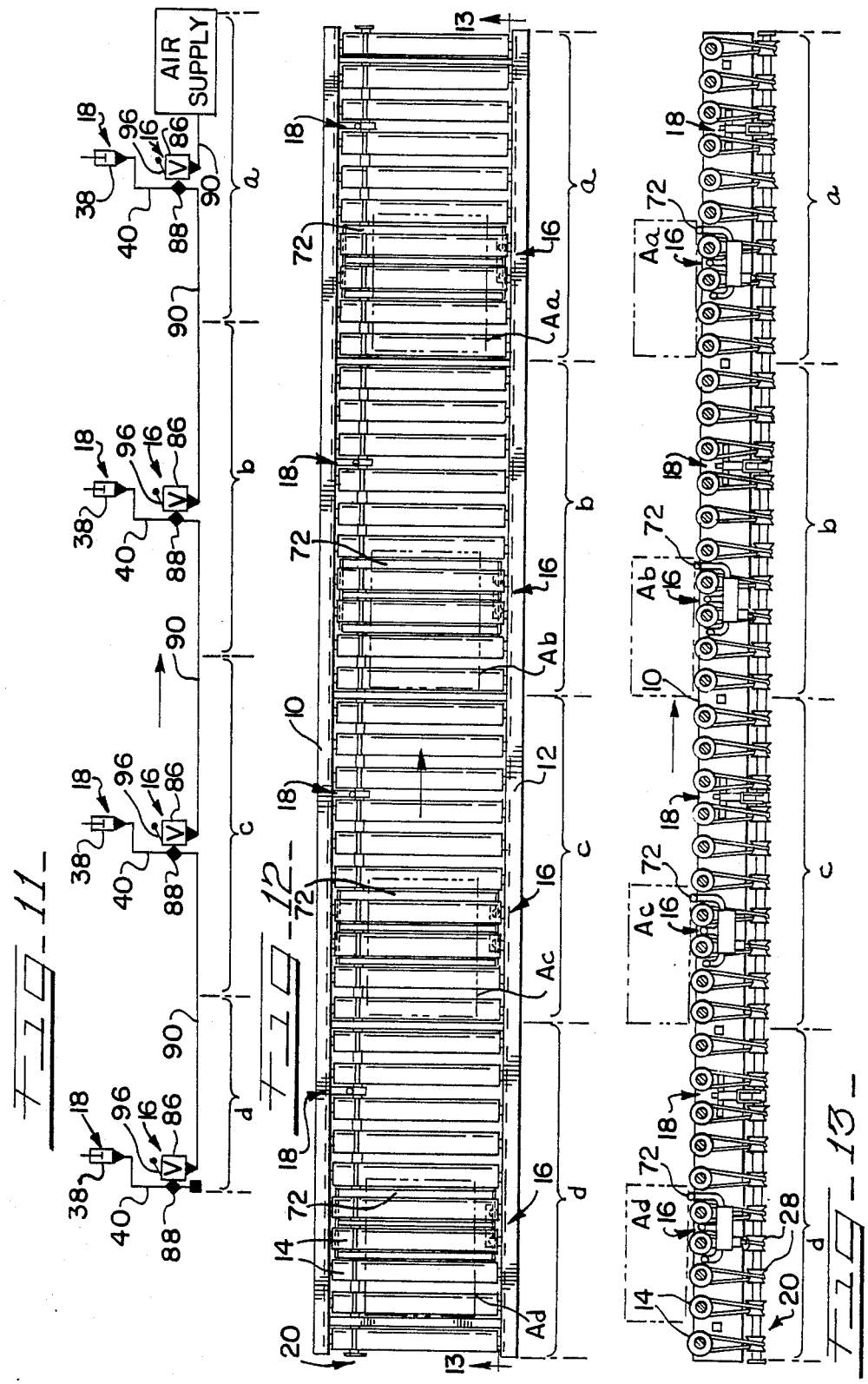

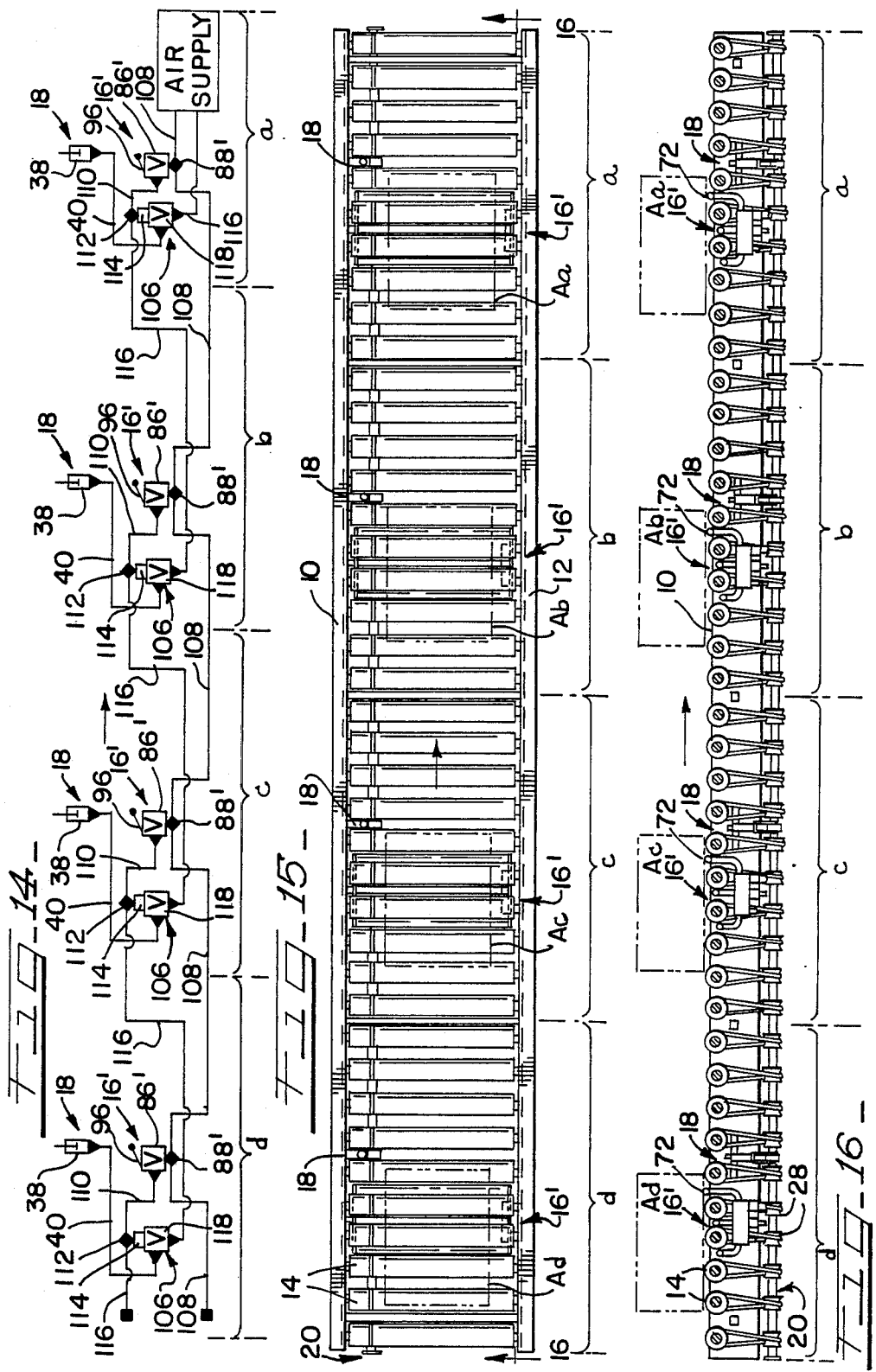

ZERO PRESSURE ACCUMULATION CONVEYOR AND BRAKE ASSEMBLY

This application is a continuation of application Ser. No. 900,268, filed Aug. 26, 1986, now abandoned, which is a continuation of application Ser. No. 689,509, filed Jan. 8, 1985, now abandoned, which is a continuation of application Ser. No. 343,222, filed Jan. 27, 1982, now abandoned.

BACKGROUND AND SUMMARY OF THE INVENTION

The present invention relates to live roller conveyors used to transport articles along a predetermined path and, more particularly, to zero pressure accumulation conveyors and brake assemblies therefor.

Live roller conveyors and, even more particularly, accumulation conveyors are well known in the art. Such accumulation conveyors have, in the past, employed various mechanisms for controlling the rotation of the conveyor rollers to allow them to be selectively rotated or stopped to accommodate accumulation of the articles being conveyed by the conveyors. The rollers are rotated to convey the articles to a collection or accumulation location and, once one or more of the articles have reached that location, the rollers are stopped to provide for accumulation.

One such mechanism is shown in U.S. Pat. No. 3,650,375 (Fleischauer et al). That patent discloses live rollers, each of which is driven by a resilient O-belt looped about a pulley beneath the rollers. The pulley is movable axially along a driven shaft. When articles are being conveyed by the rollers, the pulley axially slides along the driven shaft to assume a position in which it is frictionally engaged with the driven shaft to cause the pulley to rotate with the drive shaft and, thereby, drive the rollers by way of the O-belt. Once an article is accumulated at a desired location on the conveyor, movement of the article is prevented either by engagement of the article with a conveyor discharge gate or by contact of the article with a preceding article. When this latter condition occurs, the rollers beneath the article which has now stopped experience a frictional counter force on their cylindrical surfaces due to the weight of the overlying article which causes the axially movable pulleys to move axially along the driven shaft to such point that their frictional engagement with the driven shaft is no loner sufficient to allow the pulleys to rotate with the driven shaft, thereby causing the pulleys to slip relative to the driven shaft and to cease to impart driving force to the live rollers through the O-belts.

The aforementioned construction is perfectly acceptable in most uses. However, it relies to a principal extent upon some measure of restraining contact of the articles, either with a conveyor discharge gate or between the articles themselves. Such contact is of some concern, however, where the articles are extremely delicate, for example, electronic equipment in which extremely delicate handling of the articles is necessary to avoid damage. For such delicate equipment, it is desirable to eliminate all contact of the articles with a gate or with other articles to eliminate any possibility of impact or jarring of the equipment. In addition, such mechanisms rely upon frequent or continuous slippage of various elements of the drive system relative to other elements when the articles have reached their accumulation location. Such slippage may result in early wear and the need for early replacement of the elements.

Various mechanisms have been employed in the past for positively controlling the rotation of the driven shaft, either in combination with such slidable pulleys or otherwise, in an attempt to overcome at least some of the aforementioned disadvantages. One such mechanism employing a clutch assembly is shown in U.S. Pat. No. 3,840,110 (Molt et al). In that patent, several relatively complex clutching mechanisms are disclosed which operate to couple the driven shaft and its pulleys with a drive shaft to drive the driven shaft, its pulleys, O-belts and conveyor rollers when it is desired to move an article along the conveyor, but to positively uncouple the driven shaft in response to the actuation of suitable triggering mechanisms which sense the arrival of an article at a desired accumulation location. Although such clutching mechanisms minimize contact between the articles being conveyed and reduce frictional heat buildup and wear of the drive elements, such mechanisms are relatively complex with the attendant need to stock a large number of repair parts, and the increased difficulty of assembly and maintenance which always accompanies mechanisms of relatively complex construction.

Brake assemblies have also been employed in the past in conjunction with such conveyor drive and driven shafts. One such brake assembly is shown, for example, in U.S. Pat. No. 3,696,912 (Fleischauer et al). In that patent a brake assembly is disclosed which is mechanically actuated by a suitable trigger element which senses the presence of the article at its desired accumulation location. The trigger is mechanically coupled by a cable or chain which is connected to the brake assembly to cause the brake to engage a key on the driven shaft to lock the driven shaft against rotation. Although this mechanical key brake construction is, likewise, acceptable in a wide range of uses, it has the disadvantage of the need for relatively frequent maintenance and adjustment and some jarring of the elements and of the articles results from the positive key locking action.

The zero pressure accumulation conveyor and brake assembly of the present invention overcome the several aforementioned disadvantages of the prior constructions. A zero pressure accumulation conveyor and brake assembly constructed in accordance with the principles of the present invention minimize frictional heat and wear between the elements which slip relative to each other, thus resulting in a decrease in the need for maintenance and repair. In a zero pressure accumulation conveyor and brake assembly incorporating the principles of the present invention, positive and rapid braking action is imparted to the drive element of the conveyor to achieve rapid deceleration of the articles without damage to the articles, even though sufficient slip between the drive elements is retained with its attendant advantages. A zero pressure accumulation conveyor and brake assembly constructed in accordance with the principles of the present invention is safe, quiet and simple in construction, thereby substantially reducing the need for maintenance and in time in assembling of the conveyor, and the need for maintaining a substantial spare parts inventory is also reduced.

In one principal aspect of the present invention, a brake assembly comprises rotatable drive shaft means having a substantially cylindrical surface and torque tube means. The torque tube means also define a substantially cylindrical exterior surface and the drive shaft means extends axially into the torque tube means. The diameter of the cylindrical surface of the drive shaft means is slightly less than the internal diameter of the torque tube means such that the drive shaft means is capable of frictionally engaging the interior of the torque tube means to rotate the torque tube means when the drive shaft means is rotated, but is capable of slipping relative to the torque tube means when rotation of the torque tube means is restrained. Clamping surface means substantially surround at least a portion of the exterior surface of the torque tube means and the clamping surface means is movable relative to that exterior surface between a first position in which the clamping surface means is moved out of contact with the exterior of the torque tube means and the rotating drive shaft means rotates the torque tube means, and a second position in which the clamping surface means is moved into contact with the exterior of the torque tube means to restrain the torque tube means from rotating with the drive shaft means.

In another principal aspect of the present invention, the aforementioned torque tube means is formed of an organic polymer, preferably nylon, and the drive shaft is a hard metal, preferably steel.

In still another principal aspect of the present invention, at least one pulley is mounted on the exterior surface of the torque tube means and the pulley is axially movable on the torque tube means so as to frictionally engage the exterior surface of the torque tube means to rotate therewith when the torque tube means rotates. However, the pulley is rotationally slippable relative to the exterior surface of the torque tube means when the clamping surface means is moved to its second position.

In still another principal aspect of the present invention, the aforementioned brake assemblies are employed in combination with a plurality of live rotatable rollers for supporting and conveying an article along a plane and a plurality of endless resilient belts are looped about these rollers and the torque tube means to drive the rollers when the torque tube means is rotated by the drive shaft means.

In still another principal aspect of the present invention, trigger means are included in the last mentioned combination for sensing the presence of an article being conveyed by the rollers and control means are responsive to the trigger means to move the clamping surface means between its first and second positions, the trigger means, clamping surface means and torque tube means being constructed and arranged to operate the rollers in either a singulation mode or a slug mode.

These and other objects, features and advantages of the present invention will become apparent upon consideration of the detailed description of the invention to follow.

BRIEF DESCRIPTION OF THE DRAWINGS

In the course of this description, the drawings will be frequently referred to in which:

FIG. 1 is a fragmentary perspective view of a live roller accumulation conveyor incorporating the principles of the present invention;

FIG. 2 is a fragmentary plan view of the accumulation conveyor, with certain elements thereof broken away, as viewed substantially along line 2—2 in FIG. 1;

FIG. 3 is a partial side elevational view of the accumulation conveyor, with portions thereof broken away, as viewed substantially along line 3—3 in FIG. 2;

FIG. 4 is a partial broken plan view of one full section and two partial additional sections of the drive shaft, driven shaft and pulleys in the preferred embodiment of accumulation conveyor of the present invention;

FIG. 7 is a partially broken end elevational view of a trigger mechanism for use in the slug mode of operation of the conveyor of the present invention and as viewed substantially along line 7—7 in FIG. 2;

FIG. 8 is a broken side elevational view of the last-mentioned trigger assembly as viewed substantially along line 8—8 in FIG. 7;

FIG. 9 is a partially broken end elevational view of a trigger mechanism for use in the singulation mode of operation of the conveyor of the present invention;

FIG. 10 is a broken side elevational view of the last-mentioned trigger assembly as viewed substantially along line 10—10 of FIG. 9;

FIG. 11 is a schematic view showing a preferred pneumatic control system for four accumulation conveyor sections for controlling the conveyor in the slug mode;

FIG. 12 is a partial plan view of a preferred embodiment of conveyor of the present invention showing the positioning of the control elements shown in FIG. 11 for the slug mode of operation;

FIG. 13 is a partial cross sectioned side elevational view of the conveyor as viewed substantially along line 13—13 in FIG. 12;

FIG. 14 is a schematic view showing a preferred pneumatic control system for four accumulation conveyor sections for controlling the conveyor in the singulation mode;

FIG. 15 is a partial plan view of a preferred embodiment of conveyor of the present invention showing the positioning of the control elements shown in FIG. 14 for the singulation mode of operation; and FIG. 16 is a partial cross sectioned side elevation view of the conveyor as viewed substantially along line 16—16 in FIG. 15.

DESCRIPTION OF THE PREFERRED EMBODIMENTS

Figure 5:
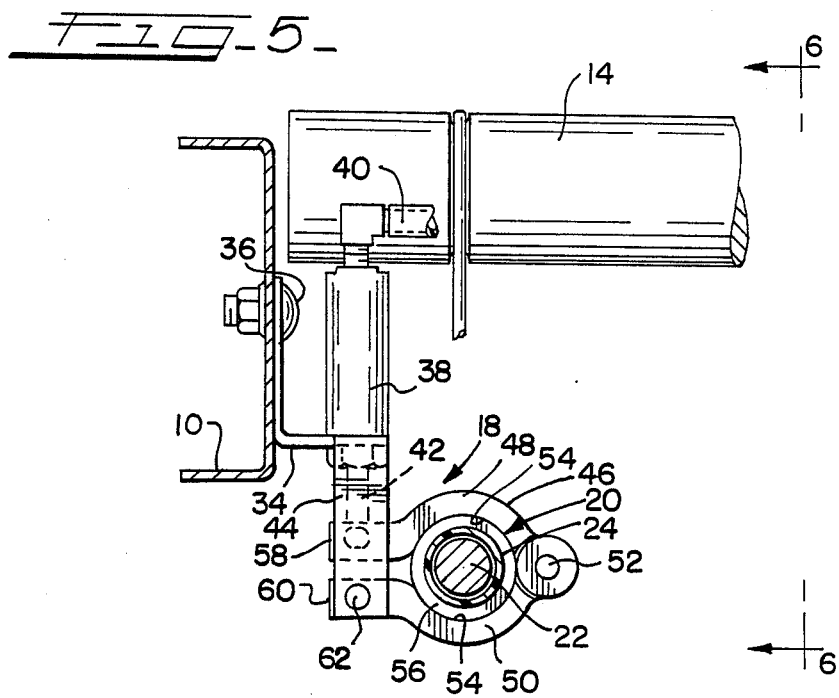
FIG. 5 is partial broken end elevational view of a preferred embodiment of brake assembly incorporating the principles of the present invention as viewed substantially along line 5—5 in FIG. 2.

Preferred embodiments of the present invention are shown in the drawings. With particular reference to FIGS. 1-3, a preferred embodiment of a live roller zero pressure accumulation conveyor is shown incorporating the principles of the present invention.

The conveyor, in general, includes a frame having a pair of spaced parallel side channels 10 and 12 which support a plurality of individually powered transverse rollers 14 for rotation. The upper surface of the individual rollers 14 are positioned in a common plane to define a path line as shown by the unnumbered arrows in the drawings along which conveyed articles are propelled in a direction as indicated by the arrows. In addition, components of the preferred embodiment of the zero pressure accumulation conveyors shown in FIGS. 1-3 include, generally, a trigger assembly 16 which senses the presence of an article at a specified location on the conveyor, a brake assembly 18 which restrains the motion of the rollers 14, and a drive mechanism, generally 20, for imparting power to the rollers 14 to drive them.

The Drive Assembly

The preferred embodiment of drive assembly 20 will first be discussed in detail.

As shown best in FIGS. 1-4, the drive assembly 20 includes a cylindrical lineshaft or drive shaft 22 which preferably extends continuously over the entire length of the conveyor. The drive shaft 22 is preferably formed of a hard metal, such as cold rolled steel.

Figure 6:
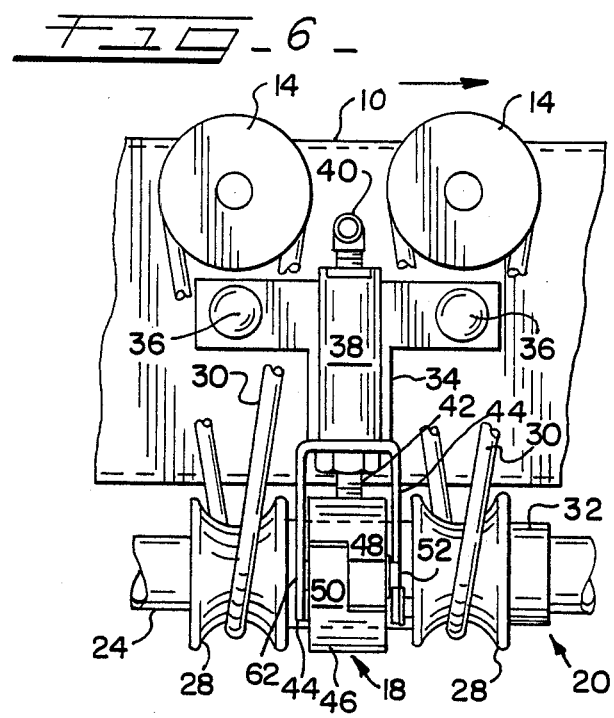
FIG. 6 is a partially broken side elevational view of the brake assembly as viewed substantially along line 6—6 in FIG. 5.

A plurality of independent torque tubes, generally 24 as shown in FIGS. 5 and 6, are positioned concentrically over the drive shaft 22, one torque tube 24a-24c each being located in longitudinally spaced sections a-c of the conveyor as shown in FIGS. 1-4. The torque tubes for each of these sections a-c are denoted by the numerals 24a-24c, respectively, in FIGS. 1-4. Each of the respective torque tubes is preferably formed of an organic polymer of which nylon is preferred. A suitable nylon may, for example, be nylon 6/6LNP RL-4540, although it will be understood that other nylons as well as other organic polymers may be selected by one skilled in the art in the manufacture of the torque tubes 24 after that person has appreciated fully the invention disclosed herein. The internal diameter of the torque tubes 24 and the external diameter of the drive shaft 22 are dimensioned and the materials from which the drive shaft 22 and torque tubes 24 are made as well as the surface characteristics of these elements are selected such that when the drive shaft 22 is rotated, it will drive the respective torque tubes 24 by frictional engagement of the cylindrical surface of the drive shaft 22 with the interior surface of the torque tubes 24.

Each of the torque tubes 24a-24c rotates independently of each other. This is accomplished by terminating the torque tubes 24 such that separate independent tubes are provided for each section a-c as shown in FIGS. 1-4. The ends of the torque tubes 24 at the boundaries of each section a-c are preferably mounted in a suitable bearing 26 attached to the frame of the conveyor by suitable means (not shown).

A plurality of slidable pulleys 28 are mounted on each of the torque tubes 24a-24c as shown in FIGS. 1-4. The pulleys 28 are axially slidable back and forth along their respective torque tubes 24 such that when they are positioned axially in one location they frictionally engage their torque tube to rotate with their respective torque tubes, but when they are displaced from that axial position, they slip relative to their torque tubes so that they do not rotate in unison with the latter. Such operation is more concisely described in the aforementioned U.S. Pat. No. 3,650,375 (Fleischauer et al). The pulleys 28 are also preferably formed of an organic polymer material, such as an acetal resin of which Delrin is one suitable form.

A resilient belt 30, preferably formed of an elastomeric material, is looped about each of the pulleys and a circumferential groove 31 in an overlying roller 14 of the conveyor as shown in FIGS. 1-4. Each of the belts 30 preferably comprises an O-belt in cross-section.

Although a plurality of pulleys 28 are shown in the drawings on the torque tubes 24, it will be understood that the pulleys may be replaced by indentations cast integrally with each of the torque tubes as is known in the art.

Where the pulleys 28 are employed, it may also be desirable to provide spaced collars 32, as shown in FIGS. 2-4, fixed to the exterior surface of the torque tubes at spaced locations to limit the axial movement of the pulleys 28 and prevent interference between adjacent pulleys.

It will be seen from the preceding description of the drive assembly 20 that the drive belts 30 and rollers 14, the drive belts 30 and pulleys 28, the pulleys 28 and the exterior surface of torque tubes 24a-24c, and the interior surface of torque tubes 24a-24c and the surface of drive shaft 22 are all in frictional engagement with each other and will rotate in unison with each other due to such engagement, but may slip relative to each other under certain conditions of restraint of certain of the elements as will be described in more detail to follow.

The Brake Assembly

The brake assembly 18 is shown in detail in FIGS. 5 and 6. The brake assembly 18 includes an L-shaped bracket 34, the vertical leg of which is preferably T-shaped and is bolted by bolts 36 to one of the side channels 12. An air cylinder 38 which receives air from one of the trigger assemblies 16 through conduit 40 is mounted to the horizontal leg of the bracket 34 and a piston rod 42 extends downwardly from the cylinder 38 as shown in FIGS. 5 and 6.

The horizontal portion of the bracket includes a pair of downwardly extending flanges 44 between which clamping means 46 of the present invention are mounted. The clamping means comprise a pair of shoes 48 and 50 which may be formed of an organic polymer or other suitable material. The shoes are preferably formed of tough nylon. The shoes 48 and 50 are coupled to each other at one side by a pivot pin 52. Each of the shoes 48 and 50 includes a substantially semi-cylindrical portion having a curved clamping surface 54 as shown in FIG. 5 which is adapted to be pivoted about pivot pin 52 into and out of contacting relationship with a cylindrical sleeve 56 located at each of the brake assembly locations. The cylindrical sleeve 56 is fixed to the torque tube 24 and the sleeve is preferably formed of metal, such as aluminum. The sleeve 56 is preferably bonded to its torque tube by a suitable adhesive such as, for example, LOCTITE 326 adhesive, activated by LOCTITE 707 activator. Thus, the sleeve 56 always rotates with the torque tube 24.

The shoes 48 and 50 each include arms 58 and 60 extending from the cylindrical portion of the shoes opposite the pivot pin 52 as shown in FIG. 5. The end of the arm 60 on the bottom shoe 50 is pivotally fixed adjacent the bottom of downwardly extending flange 44 by a pin 62 between the flanges and the upper arm 58 on the upper shoe 48 is fixed to the piston rod 42 and is movable in the vertical direction by the piston rod between the flanges 44.

Thus, depending upon whether air is present or absent in the conduit 40 from a given trigger assembly 16, the upper shoe 48 will be pivoted by piston rod 42 into either a first position in which the clamping surfaces 54 are moved out of contact with the outer surface of sleeve 56 to allow the sleeve and its torque tube 24 to be rotated by the drive shaft 22, or to a second position in which the clamping surfaces 54 engage the sleeve 56 to restrain their rotation by the drive shaft.

The Trigger Assembly

The trigger assembly 16 will now be described, first by referring in particular to FIGS. 7 and 8 which show the trigger assembly for the slug mode of operation of the conveyor.

The trigger assembly shown in FIGS. 7 and 8 includes a horizontally disposed E-shaped cam 64 adjacent each of the side channels 10 and 12. The cam 64 includes three upwardly extending legs of the E, legs 66, 68 and 70 in descending order of length. The longest of the legs 66 includes a cam roller 72 which extends across the width of the conveyor and is rotatably mounted between the extremities of the legs 66 on opposite sides of the conveyor as shown in FIG. 7. The upper surface of the roller 72, when an article is absent, extends slightly above the plane of the tops of the rollers 14 as shown in FIG. 8, but will be biased downwardly by an article which is being conveyed when the article is positioned over the roller 72. The roller 72 preferably rises above the upper surfaces of the roller 14 by approximately ⅜ inch.

The intermediate leg 68 of the E-shaped cam 64 is the pivot mounting for the cam. A rod 74 extends transversely across the conveyor and is mounted between the side channels 10 and 12 as shown in FIG. 7 to pivotally mount the cam 64 to the side channels and allow the cam and, in particular, its roller 72 to pivot to the position show in FIG. 8 as well as to a lower position in which the upper surface of roller 72 lies in the same plane as the upper surfaces of rollers 14.

The shortest leg 70 of the trigger assembly 16 includes a counterbalancing weight 76 in the form of a rod or tube which also extends transversely across the conveyor and couples the legs 70 of the cams 64 on both sides of the conveyor bed. The weight of the counterbalance 76 and its spacing from cam pivot rod 74 is such that the roller 72 will be biased to its upward position as shown in FIG. 8 in the absence of any other forces.

The axes of the pivot rod 74, of rotation of the conveyor rollers 14 and of the cam roller 72 are preferably positioned in a predetermined relationship to each other. The axis of pivot rod 74 is preferably located in a plane in or above the plane defined by the axes y of the rollers 14, and the axis z of rotation of the cam roller 72 is preferably in a plane below the plane of the upper surface of the rollers 14 when roller 72 is in its uppermost position. Such positioning, together with the configuration of the E-shaped cam 64, allows the trigger to be mounted on a conveyor without particular concern as to the direction of flow of the articles. Such positioning and configuration will allow and not impair the movement of articles in either direction on the conveyor as, for example, if it is desired to manually backup some of the articles which have already been accumulated.

It will also be noted that the configuration of the E-shaped cam 64 is such that it is not necessary to remove any of the powered live rollers 14 to accommodate the trigger assembly. This is particularly advantageous where the articles being handled are of short dimension in the direction of the path in which they are being conveyed.

The trigger assembly shown in FIGS. 7 and 8 also includes an L-shaped bracket 78 which is mounted by bolts 80 to the side channel 12. Although it is preferred that the bracket 78 and the operating components of the trigger assembly be mounted to the side channel 12, rather than the side channel 10 to which the brake assembly 18 has been mounted, it will be understood that both the trigger assembly and the brake assembly may be mounted on the same side channel. Mounting of these respective assemblies to opposite side channels is preferred, however, because it facilitates assembly and maintenance. The L-shaped bracket 78 also includes a horizontal leg upon which a pneumatic air valve assembly, generally 82, and an adjustable limit stop 84 are also mounted.

The air valve assembly 82 includes a valve body 86 having a T-fitting 88 with two conduits 40, as previously described, and 90 coupled to the fitting. As previously described, conduit 40 is coupled to the air cylinder 38 of a brake assembly 18 as shown in FIGS. 5 and 6. Conduit 90 is coupled to the bottom of the valve body 86 as shown in FIGS. 7 and 8, but of the valve body of the trigger in the next upstream section of the conveyor. As shown in FIGS. 7 and 8, the conduit 90 entering the bottom of the valve body is from either the T-fitting on the next downstream trigger assembly or from the air supply as shown in FIG. 11, and the conduit 90 extending horizontally to the left of the T-fitting 88 is to the next upstream trigger assembly.

Pivotally mounted at 94 on the horizontal leg of the bracket 78 is a cam follower arm 96 and roller 98. A plunger rod 100 extends into the valve body 86, as shown in FIGS. 7 and 8, to operate the valve in the valve body 86. The plunger rod 100 is preferably spring loaded upwardly to force the cam roller 98 against the underside of the cam 64 as shown in FIG. 8.

The limit stop 84 preferably includes a bolt 102 which is threaded upwardly through the horizontal leg of the bracket 78 to act as an adjustable limit stop for the pivotal movement of cam 64. The bolt 102 is adjusted so that it also contacts the underside of the cam 64 as shown in FIG. 8 such that the cam roller 72 projects above the plane of the tops of the rollers 14 by the desired distance as previously described. Once the bolt 102 is moved to its desired adjusted position, it is secured in that position by lock nuts 104.

As previously mentioned, the trigger assembly 16 shown in FIGS. 7 and 8 is the trigger assembly which is preferably employed in the slug mode of operation of the conveyor. The preferred trigger assembly 16' for use in the singulation mode of operation of the conveyor is shown in FIGS. 9 and 10. Numerous ones of the components in the singulation mode trigger assembly 16' are identical to those previously described in the slug mode assembly 16 shown in FIGS. 7 and 8. Accordingly, like reference numerals will be employed to designate substantially like components and where the components do differ in some respect between the singulation and slug modes, the superscript "'" will be employed to designate such components in the singulation trigger assembly 16' which will now be described.

Essentially, the major differences between the previously described slug mode trigger assembly 16 and the singulation trigger assembly 16' are somewhat different air conduit couplings and the provision of an additional pilot valve assembly 106 in the singulation trigger assembly 16'.

The valve body 86' of the singulation trigger assembly 16' includes a downwardly depending T-fitting 88' having a pair of conduits 108 which couple the valve bodies 86' of the trigger assemblies 16' in adjacent conveyor sections to each other.

As shown in FIG. 9, a third conduit 110 extends from valve body 86' to a T-fitting 112 on a pilot actuator 114 on each of the pilot valve assemblies 106. The other conduit 116, extending from the T-fitting 112 as shown in FIG. 10, ports air from the T-fitting 112 to the bottom of the valve body 118 of the pilot valve assembly 106 in the next downstream trigger assembly 16' as shown in FIGS. 1, 10 and 14.

With the mechanical elements of the preferred embodiments of zero pressure accumulation conveyors and brake assembly of the invention having now been described, a description of the operation of the conveyor and its control circuitry in both the slug and singulation modes will now be described.

The Operation in the Slug Mode

Although reference may be occasionally made to other figures in the drawings, the principal figures relied upon in the description of operation in the slug mode are FIGS. 11–13 and, to some extent, FIGS. 7 and 8 of the slug mode trigger assembly 16. The brake assembly 18 and drive assembly 20 are substantially identical to each other in both the slug and singulation modes.

Prior to describing the sequence of operation in the slug mode, it should be stated that the general manner of operation in that mode is that anytime an article A is removed from the conveyor, all of the upstream articles will advance one position simultaneously.

Referring now particularly to FIGS. 11–13, it will be initially assumed that an article A is located in each of the accumulator sections a–d as shown. Thus, an article Aa will be positioned over the cam roller 72 of trigger assembly 16 in section a, an article Ab will be positioned over cam roller 72 of trigger assembly 16 in section b, etc.

When these cam rollers 72 are depressed by the articles A, the cam follower arms 96 of each of the respective valve bodies 86 will also be depressed and, referring to FIGS. 7 and 8, the valve in the valve body 86 will be opened, allowing air to pass from the air supply shown in FIG. 11, through conduit 90 to and through the valve body 86 in section a, the T-fitting 88 and conduit 40, to the cylinder 38 of the brake assembly 18 also in section a. Thus, cylinder 38 of brake assembly 18 will be actuated to cause the piston rod 42, shown in FIGS. 5 and 6, to move downwardly and to cause the clamping surfaces 54 of shoes 48 and 50 to clamp and restrain the sleeve 56 and torque tube 24a in section a, thus restraining rotation of torque tube 24a and isolating the driving force imparted by the continuously rotating drive shaft 22 from the conveyor rollers 14.

In this condition, air also passes from the T-fitting 88 in section a through conduit 90 to valve body 86 of the trigger assembly 16 in section b. Because its cam follower 96 is also depressed by article Ab positioned over roller 72 of the cam, the valve in valve body 86 in section b will, likewise, be opened, porting air to its T-fitting 88 to energize the brake assembly 18 in section b to secure power to the rollers 14 in that section. Air will also be ported through conduit 90 to the next upstream valve body 86 in section c. Thus, it will be seen that all of the valves in valve bodies 86 in each of the sections and will be opened to port air to the brake assemblies 18 in each of the sections, stopping all of the rollers 14 because all of the articles Aa–Ad desired to be accumulated have been accumulated.

When article Aa is removed from the discharge section a of the conveyor, the roller 72 of the trigger assembly 16 in section a will rise due to the force exerted by the counterbalance 76 shown in FIG. 8. When the roller 72 rises, the cam follower 96 in section a will also rise and the plunger rod 100, as shown in FIGS. 7 and 8, will move upwardly by spring pressure closing the valve in valve body 86 in section a. When this valve is closed, the air supply will be cut off to the entire system because all of the valve bodies 86 are connected in series. Accordingly, air will no longer be supplied through conduit 40 to the cylinder 38 of the brake assembly 18 in section a and the piston rod 42, as shown in FIGS. 5 and 6, will rise causing the shoes 48 and 50 to pivot apart and move out of contact with sleeve 54. Sleeve 54 is now no longer restrained by the brake assembly and the driving action of the continuously rotating drive shaft 22 operates upon the interior of the torque tube 24a to cause the torque tube to rotate along with its pullies, O-belts and the rollers 14 in section a.

As previously mentioned, when air is cut off to the valve body 86 in section a, air will no longer pass through the T-fitting 88 of that valve body and conduit 90 to the next upstream valve body 86 of trigger assembly 16 in section b. Thus, even though the cam follower 96 is still depressed by the article Ab in section b, air is now absent from conduit 40 due to the closing of the valve in valve body 86 in section a. Absent such air, cylinder 38 of brake assembly 18 in section b causes the piston rod 42 of the brake assembly to move upwardly in similar fashion as did the rod 42 in section a to remove the restraint from the torque tube 24b in section b. Thus, it will be seen that because the respective trigger assemblies in this slug mode are effectively coupled to each other in series, when air is shut off at the valve body 86 in section a, the air will be secured throughout the entire system. Once this air is secured, all of the brake assemblies will be deenergized, causing all of the articles Ab–Ad to advance simultaneously until the then next lead article Ab enters section a and contacts the roller 72 of the trigger assembly 16 in section a.

Once the article Ab contacts the roller 72 in section a, the valve in valve body 86 in that section will again be opened to port air via T-fitting 88 to the conduit 40 and cylinder 38 to reset the brake assembly 18 in section a, and through conduit 90 to the valve body 86 in section b. If article Ac has not yet arrived at cam roller 72 in section b, the valve in valve body 86 in section b will remain closed, causing the brake assembly 18 in section b to remain deenergized and allowing the rollers 14 in section b to continue to operate until article Ac contacts roller 72 in section b.

Operation in the Singulation Mode

In describing the operation in the singulation mode, frequent reference will be made primarily to FIGS. 14–16 and also to FIGS. 9 and 10.

In the singulation mode, only one of the articles A will advance at a time. Once it has left its previous at rest position and is enroute to its destined accumulation position, the next article will begin to advance to replace the enroute article. The articles do not all advance simultaneously as in the previously described slug mode.

Again, it will initially be assumed that articles Aa–Ad are present and occupy each of the respective accumulation positions in each of the sections a–d as shown in FIGS. 15 and 16. In this condition, article Aa in section a will have moved over cam roller 72 of trigger assembly 16' in section a, article Ab will have moved over cam roller 72 in trigger assembly 16' in section b, etc.

In the singulation mode, air is supplied to all of the trigger valves simultaneously and in parallel from the air supply shown in FIG. 14 via conduits 108. Thus, unlike the slug mode, all of the valve bodies 86' are energized and ready to port air depending upon whether an article A is absent or present in their respective conveyor sections. A conduit 116 from the air supply to the valve body 118 of pilot valve assembly 106 in section a also supplies air to that valve body ready for opening of the valve.

Because article Aa has depressed cam roller 72 in section a, cam follower 96 will also be depressed. Thus, plunger rod 100 shown in FIGS. 9 and 10 will, likewise, be depressed to open the valve in valve body 86' in section a causing air to pass through conduit 110 to T-fitting 112 on the pilot actuator 114 of pilot valve assembly 106 in section a. When air is supplied to the pilot actuator 114, it actuates the valve in valve body 118 of pilot valve assembly 106 to open that valve allowing air to pass from conduit 116 from the air supply though conduit 40 to cylinder 38 of the brake assembly 18 in section a. Air to cylinder 38, as shown in FIGS. 5 and 6, causes piston rod 42 to move downwardly and the shoes 48 and 50 to move together to clamp sleeve 56 and torque tube 24a in section a. This clamping motion restrains the movement of torque tube 24a allowing the continuously rotating drive shaft 22 to slip relative to the torque tube and denergize the conveyor rollers 14 in section a.

In this fully loaded condition, i.e. articles Aa–Ad on each of sections a–d, air will also be ported from the T-fitting 112 in section a through conduit 116 to the valve body 118 of pilot valve assembly 106 in section b. As previously mentioned, air is continuously ported via conduit 108 from the T-fitting 88' in section a to T-fitting 88' in section b.

Because the article Ab in section b, likewise, is overlying the cam roller 72 in section b, cam roller 96 of the trigger assembly 16' in section b will be depressed, opening the valve in valve body 86' in section b to cause air to pass through conduit 110 to the T-fitting 112 on the pilot actuator 114 of the pilot valve assembly 106 in section b. Air to this T-fitting 112 actuates the pilot actuator 114 to open the valve in valve body 118, causing air to pass through conduit 40 to the cylinder 38 of the brake assembly 18 in section b. This air, thereby, causes piston rod 42 of cylinder 38 in section b to move downwardly clamping the sleeve 56 and torque tube 24b to, likewise, restrain its movement and allow driveshaft 22 to slip relative to the torque tube deenergizing the rollers 14 in section b.

This same sequence follows upstream and, thus, all of the rollers 14 in each of the sections a–d are stopped because they each have an article Aa–Ad accumulated thereon.

It will now be assumed that article Aa is removed from the conveyor section a. When the article Aa is removed, cam roller 72 will rise in section a causing the cam follower 96 on the valve body 86' in section a also to rise. When this happens, the valve in valve body 86' in section a will close to secure air to conduit 110 to the T-fitting 112 on the pilot actuator 114 of the pilot valve assembly 106 in section a. When this happens, the valve in the valve body 118 of the pilot valve assembly 106 will also close to secure air from the air supply and conduit 116 to conduit 40 and the cylinder 38 of the brake assembly 18 in section a. With the brake assembly 18 deenergized, the piston rod 42 of the brake assembly, as shown in FIGS. 5 and 6, will move upwardly, causing the shoes 48 and 50 to move apart to release the sleeve 56 and torque tube 24a and allow them to again be rotated by the drive shaft 22 energizing rollers 14 in section a.

When the valve in valve body 86' in section a is closed, air is not only secured to the T-fitting 112 of the pilot actuator 114 in section a, but it is also secured to conduit 116 which leads to the valve body 118 of the pilot valve assembly 106 in section b. Absent such air, conduit 40 leading from the valve body 118 to the cylinder 38 of brake assembly 18 in section b will also be without air. This will cause the cylinder 38 of the brake assembly 18 also to be deenergized, thereby removing the restraining force from torque tube 24b and allowing the drive shaft 22 to rotate the torque tube 24b in section b, causing the rollers 14 in section b to be energized. Thus, the next article Ab will be advanced from section b to replace the removed article Aa in section a.

It will be seen, however, that none of the remaining articles in sections c and d will move at this time. They will not move until article Ab has cleared the cam follower roller 72 in section b. So long as article Ab is still present to depress the cam roller 72 and its cam follower 96 in section b, the valve in valve body 86' will be open to port air from conduit 108, through valve 86' in section b, conduit 110, T-fitting 112 on the pilot actuator 114 of the pilot valve assembly 106 in section b through conduit 116 to the valve body 118 in section c. Because the pilot valve assembly 106 in section c is open, this air will continue to pass through the valve body 118, conduit 40 to the cylinder 38 of brake assembly 18 in section c to actuate the brake assembly to restrain rotation of the torque tube 24c in section c.

Once article Ab has left the cam roller 72 in section b, the cam roller will move upwardly, causing the valve in valve body 86' in section b to close. When this valve closes, air will be secured to conduit 110, T-fitting 112 and conduit 116 to the valve body 118 of pilot valve assembly 106 in section c. Even though this valve remains open because it is receiving air from conduit 110 from the depressed cam follower 96 in valve body 86' in section c, air will no longer be present in conduit 40 to cylinder 38 of the brake assembly 18 in section c, deenergizing the brake assembly and allowing the torque tube 24c in section c to now commence rotation to rotate the rollers 14 in section c and begin moving article Ac toward section b to replace article Ab which has been moved to section a.

Thus, it will be seen that each of the articles will move individually, one by one, in this singulation mode.

It will also be seen that even if articles have been accumulated, for example in sections a and b, and the rollers 14 in those sections have been stopped, articles Ac and Ad will continue to move to the upstream sections until all of the sections are filled. This is because conduits 108 from the air supply as shown in FIG. 14 are coupled in parallel to each of the valve bodies 86' so that the valve bodies are ready to act anytime their respective cam followers 96 are not depressed.

Accordingly, assuming articles Aa and Ab are in their respective accumulated position in sections a and b, but that article Ac has not yet arrived at its position in section c, cam roller 72 in section c will not be depressed. In this condition, cam follower 96 in section c will be raised, closing the valve in valve body 86' in section c, thereby securing air to conduit 110 to the T-fitting 112 of the pilot actuator 114 of the pilot valve assembly 106 in section c. In the absence of such air, the pilot actuator 114 will close the valve in valve body 118 securing air to conduit 40 and the cylinder 38 of brake assembly 18 in section c, deenergizing the brake and allowing the torque tube 24c in section c to be rotated by the drive shaft 22 to energize rollers 14 in section c. Thereby, article Ac is fed until it depresses cam roller 72 in section c at which time the rollers 14 in section c will be deenergized.

It will be appreciated that although only four sections of the conveyor have been shown in FIGS. 11–16, that the number of sections may be increased or decreased as desired without departing from the principles of the present invention. It will also be appreciated that although the control circuitry of the present invention has been described in terms of a pneumatic system only, hydraulic, electrical and mechanical controls instead may be employed and may be readily selected by those skilled in the art, once they have fully appreciated the teachings of this disclosure.

From the foregoing description, it will be seen that the zero pressure accumulation conveyors and brake assembly described herein realize distinct advantages in positively preventing the contact of articles being accumulated with each other by providing a construction for positively decelerating the live rollers 14 when each of the articles arrives at their accumulation position. Moreover, the brake assembly of the present invention realizes a minimum of frictional slippage between the various elements of the present invention, positively reducing wear and heat buildup and consequent maintenance requirements.

It will be understood that the embodiments of the present invention which have been described are merely illustrative of a few of the applications of the principles of the present invention. Numerous modifications may be made by those skilled in the art without departing from the true spirit and scope of the invention.

What is claimed is:

1. A zero pressure accumulation conveyor system comprising:
    a frame;
    a plurality of spaced-apart rollers rotatably mounted on said frame to form a generally planar conveying surface;
    a rotatable drive shaft in spaced-away relation to said conveying surface;
    at least one hollow torque tube of a predetermined length which is shorter than that of said drive shaft disposed over said drive shaft in generally coaxial alignment therewith, said torque tube frictionally engaging said drive shaft for co-rotation therewith;
    at least one pulley coaxially mounted on the exterior surface of said torque tube for co-rotation therewith;
    a resilient belt looped over and engaging said pulley and one of said roller for rotatably driving said roller;
    a brake assembly including at least a pair of clamping members, each of said clamping members having a substantially semi-cylindrical arcuate clamping surface which is generally concentric with the arcuate surface of said torque tube, said clamping members being movable between a first position disengaged from said exterior surface of said torque tube, and a second position in which said clamping members each engage said torque tube to restrain the rotation thereof; and
    actuating means coupled to said clamping members and responsive to a control signal for moving each of said clamping members to said second position upon application of said control signal, whereby rotation of said torque tube is restrained when said control signal is applied to said actuating means.

2. A zero pressure accumulation conveyor system as defined in claim 1 wherein said clamping members comprise a pair of substantially similar opposed curved clamping surfaces a frame.

3. A zero pressure accumulation conveyor system as defined in claim 2 wherein said actuating means comprises a pneumatic cylinder pivotally coupled to at least one of said clamping members and said control signal comprises a compressed gas applied to said pneumatic cylinder.

4. A zero pressure accumulator conveyor system as defined in claim 2 wherein said drive shaft comprises a hard metal and said torque tube comprises an organic polymer.

5. A zero pressure accumulator conveyor system as defined in claim 4 wherein said hard metal is steel and said organic polymer is nylon.

6. A zero pressure accumulator conveyor system as defined in claim 1 wherein said drive shaft comprises a hard metal and said torque tube comprises an organic polymer.

7. A zero pressure accumulator conveyor system as defined in claim 6 wherein said hard metal is steel and said organic polymer is nylon.

8. A zero pressure accumulator conveyor system as defined in claim 1 wherein said pulley is frictionally coupled to said exterior surface of said torque tube.

9. In zero pressure accumulation conveyor system having a frame, a plurality of spaced-apart rollers rotatably mounted on said frame to form a generally planar conveying surface, rotatably mounted metal drive shaft in spaced-away relation to said conveying surface, at least one hollow torque tube formed of an organic polymer and having a predetermined length which is shorter than that of said drive shaft, said torque tube being disposed over said drive shaft in generally coaxial alignment therewith and frictionally engaging said drive shaft for co-rotation therewith, at least one pulley coaxially mounted on and engaging the exterior surface of said torque tube for co-rotation therewith, a resilient belt looped over and engaging said pulley and one of said rollers for rotatably driving said roller, and a brake assembly for restraining rotation of said torque tube in response to an applied control signal whereby drive to at least one of said rollers is restrained in response to the application of said control signal, wherein an improved brake assembly comprises:
    at least a pair of clamping members, each of said clamping members having a substantially semi-cylindrical arcuate clamping surface which is generally concentric with the arcuate surface of said torque tube, said clamping member being movable between a first position disengaged from said exterior surface of said torque tube, and a second position in which said clamping members each engage said torque tube to restrain the rotation thereof; and
    actuating means coupled to said clamping members and responsive to a control signal for moving each of said clamping members to a second position upon application of said control signal, whereby rotation of said torque tube is restrained when said control signal is applied to said actuating means.

10. A zero pressure accumulation conveyor system as defined in claim 9 wherein said metal comprises a hard metal and said organic polymer comprises nylon.

* * * * *